United States Patent
Cooper et al.

(10) Patent No.: US 12,543,143 B2
(45) Date of Patent: Feb. 3, 2026

(54) SYSTEM AND METHOD FOR DETERMINING LOCATION

(71) Applicants: DENSO International America, Inc., Southfield, MI (US); DENSO CORPORATION, Aichi (JP)

(72) Inventors: Kyle Cooper, Holland, MI (US); Eric Smith, Plainwell, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 718 days.

(21) Appl. No.: 17/860,150

(22) Filed: Jul. 8, 2022

(65) Prior Publication Data

US 2023/0055286 A1 Feb. 23, 2023

Related U.S. Application Data

(60) Provisional application No. 63/234,840, filed on Aug. 19, 2021.

(51) Int. Cl.
*H04W 64/00* (2009.01)
*H04B 17/318* (2015.01)
*H04W 52/24* (2009.01)

(52) U.S. Cl.
CPC ....... *H04W 64/006* (2013.01); *H04W 52/248* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 9,894,492 B1* | 2/2018 | Elangovan | H04W 4/023 |
| 11,089,566 B1 | 8/2021 | Oishi et al. | |
| 2016/0146922 A1* | 5/2016 | Moshfeghi | H04W 64/00 455/456.6 |
| 2020/0082653 A1* | 3/2020 | Hazebrouck | G01S 11/06 |
| 2022/0239385 A1* | 7/2022 | Oishi | H04B 17/23 |
| 2024/0048653 A1* | 2/2024 | Zilka | H04M 1/6091 |

* cited by examiner

*Primary Examiner* — Adolf Dsouza
(74) *Attorney, Agent, or Firm* — Warner Norcross + Judd LLP

(57) ABSTRACT

Location information of a portable device with respect to an object is determined based on UWB communications and using a first path power. A differential first path power may also be determined based on first and second first path power values obtained respectively by first and second devices via UWB communications with the portable device.

17 Claims, 5 Drawing Sheets

SYSTEM AND METHOD FOR DETERMINING LOCATION

TECHNICAL FIELD

The present disclosure is directed to a system and method of determining location, and more particularly toward determining a location of a portable device relative to an object.

BACKGROUND

Significant efforts have been made toward enabling the utilization of smartphones as keys to access or command the operation of an equipment device, such as a door or a vehicle. Conventional systems may rely on signal strength of communications to determine relative distance and/or position between a transmitter and a receiver. For instance, many conventional systems measure signal strength with a directional antenna to determine the relative distance and/or position between a transmitter and a receiver. This conventional arrangement has several limitations, but the principal limitation is location accuracy. Several factors can affect location accuracy. Examples of such factors include physical boundaries, external objects, moving objects, and moving aspects of the equipment device. Conventional systems may fail to achieve or maintain location accuracy in view of these or other factors.

SUMMARY

In general, one innovative aspect of the subject matter described herein can be embodied in a system for determining location information with respect to a portable device and an object. The system may include a first device disposed in a first fixed position relative to the object, where the first device may be capable of communicating with the portable device in accordance with an ultra-wideband communication protocol. The first device may be operable to determine a first power characteristic indicative of a first path power of communications between the first device and the portable device. The system may include a second device disposed in a second fixed position relative to the object, where the second device may be capable of communicating with the portable device in accordance with the ultra-wideband communication protocol. The second device may be operable to determine a second power characteristic indicative of a first path power of communications between the second device and the portable device. The system may include a controller operable to determine a differential first path power based on a difference between the first and second power characteristics respectively indicative of a first path power of communications between the first device and the portable device and a first path power of communications between the second device and the portable device. The controller may be operable to determine the location information based on the differential first path power with respect to communications with the portable device in accordance with the ultra-wideband communication protocol.

The foregoing and other embodiments can each optionally include one or more of the following features, alone or in combination. In particular, one embodiment includes all the following features in combination.

In some embodiments, the controller may include a locator operable to output the location information based on the differential first path power.

In some embodiments, the locator may include at least one parameter, where an output of the locator may be based on the at least one parameter and the differential first path power.

In some embodiments, the system may include a configuration processor operable to adjust the at least one parameter of the locator, where the configuration processor may include memory and may be operable to obtain truth information with respect to a location of the portable device relative to the object. The configuration processor may be operable to vary the at least one parameter of the locator based on a comparison of the output of the locator and the truth information.

In some embodiments, the locator may include an algorithmic model that is trainable via iterative adjustment of the at least one parameter based on a comparison of a model output for a given value of the at least one parameter and the truth information, where the algorithmic model may be operable to receive as input the differential first path power, and where the differential first path power may be correlated with the truth information with respect to the location of the portable device.

In some embodiments, the first device may include a first antenna operable to facilitate communications with a portable device antenna of the portable device, and the second device may include a second antenna operable to facilitate communications with the portable device antenna of the portable device.

In some embodiments, the first power characteristic indicative of the first path power of the communications between the first device and the portable device may be a function of a first gain of the first antenna and a portable device gain of the portable device antenna. The second power characteristic indicative of the first path power of the communications between the second device and the portable device may be a function of a second gain of the second antenna and the portable device gain of the portable device antenna. The portable device gain of the portable device may be substantially absent from the differential first path power, whereby the differential first path power may be substantially unaffected by variations in the portable device gain from one type of portable device to another type of portable device.

In some embodiments, an output of the locator may be independent of variations in the portable device gain among various types of portable devices, such that the locator may be operable to determine location information for multiple types of portable devices absent varying the at least one parameter for each type of the multiple types of portable devices.

In some embodiments, the first path power may be a power indicator associated with a first path in a multi-path environment.

In general, one innovative aspect of the subject matter described herein is a method of determining location information with respect to a portable device and an object. The method may include communicating between the portable device and a first device in accordance with an ultra-wideband communication protocol, and generating a first power characteristic indicative of a first path power of communications between the first device and the portable device. The method may include communicating between the portable device and a second device in accordance with the ultra-wideband communication protocol, and generating a second power characteristic indicative of a first path power of communications between the second device and the portable device. The method may include calculating a differential first path power based on a difference between the first and second power characteristics respectively indicative of a first path power of communications between the first device and the portable device and a first path power of communications between the second device and the portable device. The method may include and determining the location information based on the differential first path power with respect to communications with the portable device in accordance with the ultra-wideband communication protocol.

The foregoing and other embodiments can each optionally include one or more of the following features, alone or in combination. In particular, one embodiment includes all the following features in combination.

In some embodiments, determining the location information may include determining the location information based on the differential first path power and at least one parameter.

In some embodiments, the method may include adjusting the at least one parameter based on truth information with respect to a location of the portable device relative to the object.

In some embodiments, the method may include iteratively adjusting the at least one parameter to reduce an error metric determined with respect to determined location information and the truth information.

In some embodiments, the differential first path power may be substantially unaffected by variations in an antenna gain from one type of portable device to another type of portable device.

In some embodiments, first path power may be a power indicator associated with a first path in a multi-path environment.

In general, one innovative aspect of the subject matter described herein can be embodied in a device operable to determine location information with respect to a portable device and an object. The device may include a memory and a processor operably coupled to the memory. The processor may be configured to execute one or more instructions stored in the memory to obtain a first power characteristic indicative of a first path power of ultra-wideband communications between a first device and the portable device, where the first device may be disposed in a fixed position relative to the object. The one or more instructions may direct the processor to obtain a second power characteristic indicative of a first path power of ultra-wideband communications between a second device and the portable device, where the second device may be disposed in a fixed position relative to the object. The one or more instructions may direct the processor to calculate a differential first path power based on a difference between the first and second power characteristics respectively indicative of a first path power of communications between the first device and the portable device and a first path power of communications between the second device and the portable device. The one or more instructions may direct the processor to determine the location information based on the differential first path power with respect to ultra-wideband communications with the portable device.

In some embodiments, the second power characteristic may be received from the second device, and wherein the device may be the first device.

In some embodiments, the differential first path power may be substantially unaffected by variations in an antenna gain from one type of portable device to another type of portable device.

In some embodiments, the processor may be operable to determine the location information based on the differential first path power and at least one parameter, wherein the at least one parameter may be iteratively calculated by reducing an error metric calculated with respect to the location information and truth information pertaining to a location of the portable device relative to the object.

In some embodiments, the first path power may be a power indicator associated with a first path in a multi-path environment.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

A system and method are provided for determining location information with respect to a portable device and an object. The system and method may be based on UWB communications, and more particularly with respect to a first path power determined with respect to the UWB communications. In one embodiment, a differential first path power may be determined based on first and second first path power values obtained respectively by first and second devices via UWB communications with the portable device. The differential first path power may form at least part of the basis of a determination of range or distance of the portable device relative to the object. The differential first path power may be unaffected by or less affected by variations in portable devices carried and used by a user with the system, enabling a locator to be used in the system that is less affected or unaffected by such variations.

I. Overview

Figure 1:
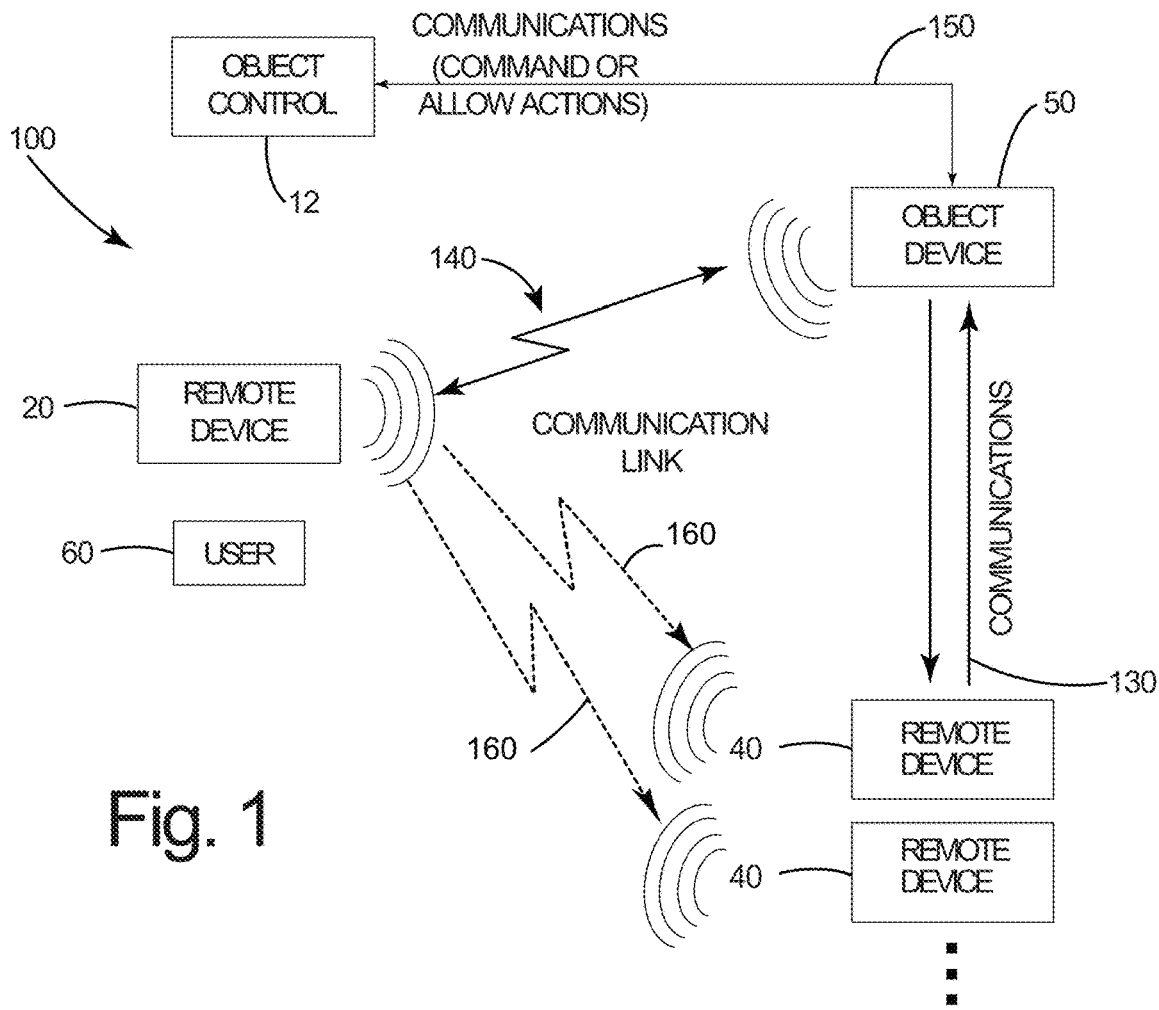
FIG. 1 shows a representative view of a system in accordance with one embodiment.
Figure 2:
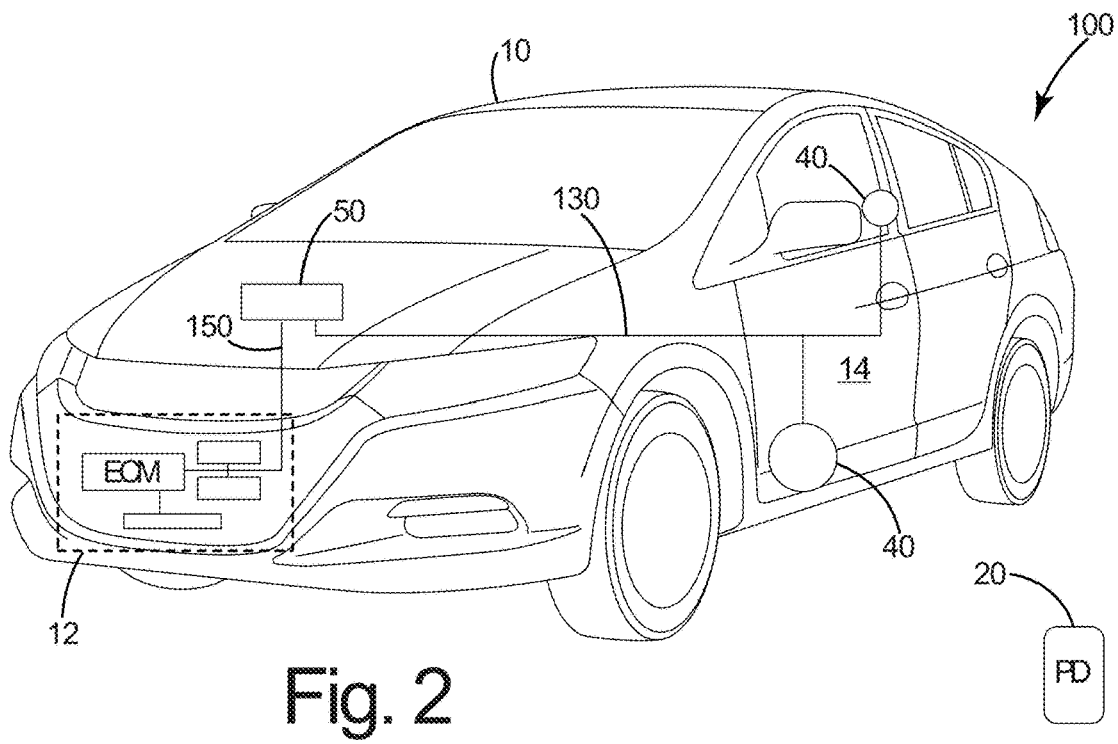
FIG. 2 shows a representative view of the system on a vehicle in accordance with one embodiment.

A system in accordance with one embodiment is shown in the illustrated embodiment of FIGS. 1 and 2 and generally designated 100. The system 100 may include one or more system components as outlined herein. A system component may be a user 60 or an electronic system component, which may be the portable device 20, a remote device 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the portable device 20, the remote device 40, and the object device 50. The features described in connection with the object device 50 depicted in FIG. 4A may be incorporated into the portable device 20, or the remote device 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus.

In one embodiment, the system may include a communication controller, such as a telematics control unit (not shown). For instance, the TCU (telematics control unit) may be connected to the object device 50 (via SPI). In another embodiment, the TCU may be combined with the object device 50. In another embodiment, the TCU may be part of the vehicle's object controller 12, or connected to the vehicle's object controller 12. In another embodiment, the TCU may be absent and data could be tunneled through the portable device (e.g., via BLE). "Tunneled" may be defined as a traditional tunnel—like running TCP/IP over BLE; however, the present disclosure is not so limited. The tunnel may be defined as a configuration that enables relevant data to be communicated to the object device 50 or other system components via commands/responses. The communication controller may be any type of control unit or system capable of facilitating communications. A communication controller may be provided in any component described herein, including the object or the portable device, or both.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (not in the cloud).

II. Object Device

Figure 3:
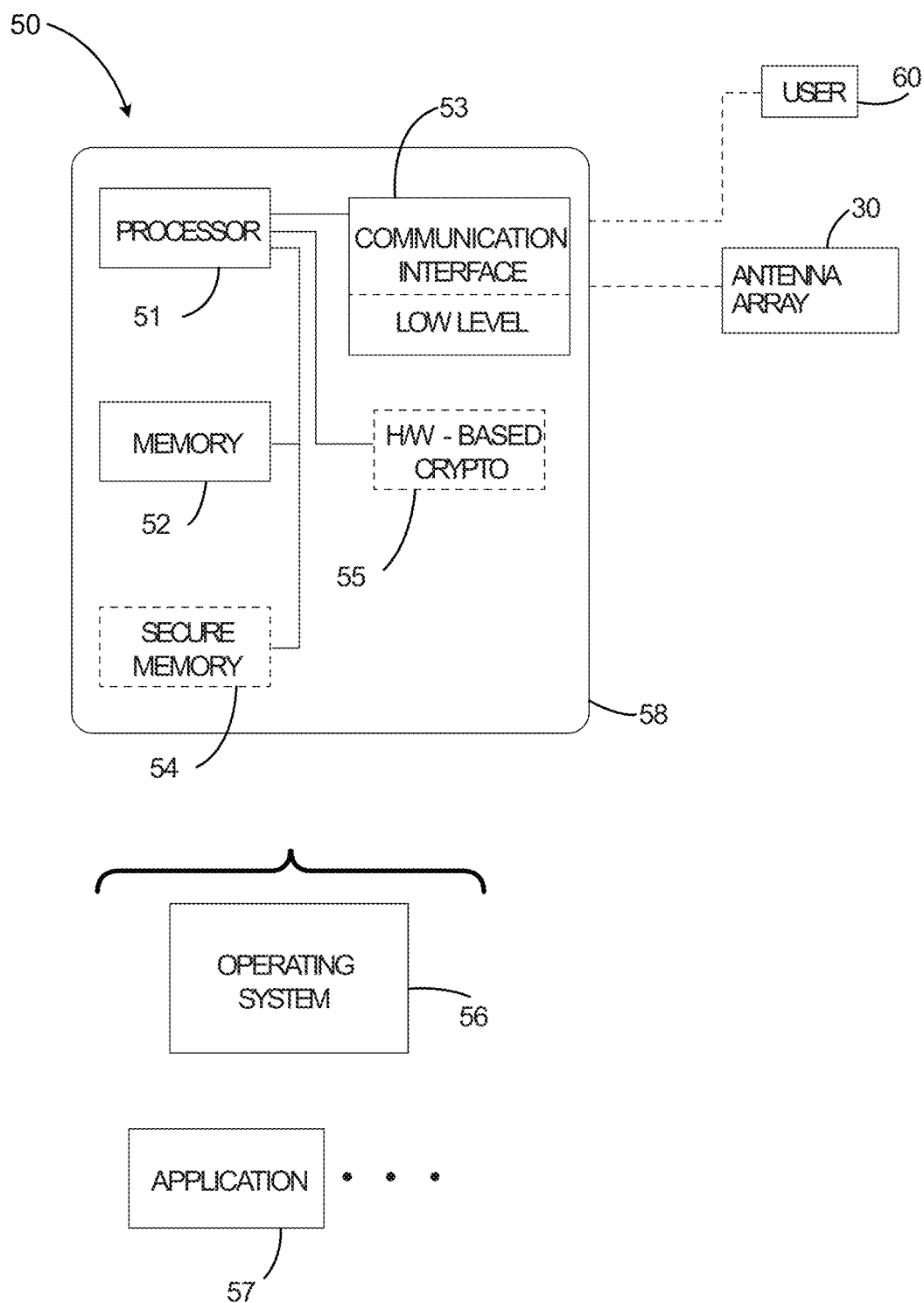
FIG. 3 shows a representative view of an object device of the system in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the portable device 20, or the remote device 40 (e.g., a sensor), or both, may similarly include a controller 58 configured to control operation or aspects of the respective system component.

The controller 58 includes any and all electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy). As described herein, the terms locator, module, model, and generator designate parts of the controller 58. For instance, a model or locator in one embodiment is described as having one or more core functions and one or more parameters that affect output of the one or more core functions. Aspects of the model, locator, module, or generator, or a combination thereof, may be stored in memory of the controller 58, and may also form part of the controller configuration such that the model, locator, module, or generator, or combination thereof is part of the controller 58 that is configured to operate to receive and translate one or more inputs and to output one or more outputs. A model, locator, module, or generator, or a combination thereof, may be parts of the controller 58 such that the controller 58 is configured to receive an input described in conjunction with the model, locator, module, or generator, or a combination thereof, and provide an output corresponding to an algorithm associated with the model, locator, module, or generator, or a combination thereof.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BLE communications, Ultrawide Band (UWB) communications, or another type of wireless communications, or a combination thereof.

As another example, the communication interface 53 may provide a wireless communication link with another system component in the form of the portable device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the portable device 20. In the illustrated embodiment of FIG. 1, the user 60 may carry the portable device 20 (e.g., a smartphone). The system 100 may facilitate locating the portable device 20 with respect to the object 10 (e.g., a vehicle) in real-time with sufficient precision to determine whether the user 60 is located at a position at which access to the object 10 or permission for an object 10 command should be granted.

In one embodiment, where the object 10 is a vehicle, the system 100 may facilitate determining whether the portable device 20 is outside the vehicle but in close proximity, such as within 5 feet, 3 feet, or 2 feet or less, to the driver-side door. This determination may form the basis for identifying whether the system 100 should unlock the vehicle. On the other hand, if the system 100 determines the portable device 20 is outside the vehicle and not in close proximity to the driver-side door (e.g., outside the range of 2 feet, 3 feet, or 5 feet), the system 100 may determine to lock the driver-side door. As another example, if the system 100 determines the portable device 20 is in close proximity to the driver-side seat but not in proximity to the passenger seat or the rear seat, the system 100 may determine to enable mobilization of the vehicle. Conversely, if the portable device 20 is determined to be outside close proximity to the driver-side seat, the system 100 may determine to immobilize or maintain immobilization of the vehicle.

The object 10 may include multiple object devices 50 or variants thereof, such as a remote device 40 coupled to an antenna array 30 in accordance with one or more embodiments described herein.

Micro-location of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of microlocation techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 2, the object device 50 (e.g., a system control module (SCM)) and a plurality of remote devices 40 (coupled to an antenna array 30) may be disposed on or in a fixed position relative to the object 10. Example use cases of the object 10 include the vehicle identified in the prior example, or a building for which access is controlled by the object device 50.

The portable device 20 may communicate wirelessly with the object device 50 via a communication link 140.

Additionally, or alternatively, the plurality of remote devices 40 may establish communication links 160 with the portable device 20. The communication links 160 may be separate from each other or shared with each of the remote devices 40. The communication links 160 in one embodiment may be passive such that the remote devices 40 monitor or sniff communications for another communication link (e.g., the communication link 140) without actively participating in or affecting communications on the other communication link.

As described herein, each of the plurality of remote devices 40 may establish separate communication links 160 with the portable device 20, simultaneously or at different times. Each of the remote devices 40 may identify a first path with respect to communications via the communication link 160. The first path may correspond to the first path of communications to arrive at a receiver of the communication link 160 within a multi-path environment in which communications take multiple paths to arrive at the receiver. The remote device 40 may determine a first path power with respect to the detected first path. The first path power may correspond to a type of signal characteristic of communications as described herein. It is noted that the present disclosure is not limited to the remote device 40 determining the first path power as a signal characteristic of communications; the remote device 40 may determine any type of signal characteristic of communications. The object device 50 may additionally or alternatively establish the communication link 140 with the portable device 20, and determine a signal characteristic of communications, such as the first path power of the communications.

In an alternative embodiment, the plurality of remote devices 40 may be configured to sniff the communications between the portable device 20 and the object device 50 to determine one or more signal characteristics of the communications, such as signal strength, angle of arrival, time of flight, or any combination thereof. In an alternative embodiment, the portable device 20 may establish communications with another device other than the object device 50, but at least one of the object device 50 and the one or more remote devices 40 may be configured to sniff these communications to determine a location of the respective device relative to the object 10.

The communication link 140 in the illustrated embodiment is a UWB communication link. However, the present disclosure is not so limited. For example, the communication link 140 may not be UWB; it may be wired or wireless and established according to any protocol, including Bluetooth Low Energy (BTLE) instead of UWB. As another example, the communication link 140 may include more than one type of communication link; e.g., the communication link 140 may be established according to both BTLE and UWB.

The determined signal characteristics may be communicated or analyzed and then communicated to the object device 50 via a communication link 130 separate from the communication link 140 between the portable device 20 and the object device 50. Additionally, or alternatively, as described herein, the portable device 20 may establish a direct communication link with one or more of the remote devices 40, and the one or more signal characteristics may be determined based on this direct communication link.

As described herein, one or more signal characteristics, such as first path power, signal strength, time of flight, and angle of arrival, may be analyzed to determine location information about the portable device 20 relative to the object 10, an aspect of the object 10, or the object device 50, or a combination thereof. For instance, a differential first path power may be determined with respect to first path power determined by first and second devices (e.g., the object device 50 and a remote device 40, or first and second remote devices 4). As another example, time difference of arrival or the angle of arrival, or both, among the remote device 40 and the object device 50 may be processed to determine a relative position of the portable device 20. The positions of the one or more antenna arrays 30 relative to the object device 50 may be known so that the relative position of the portable device 20 can be translated to an absolute position with respect to the antenna arrays 30 and the object device 50.

Additional or alternative examples of signal characteristics may be obtained to facilitate determining position according to one or more algorithms of a locator as described herein, including a distance function, trilateration function, a triangulation function, a multilateration function, a fingerprinting function (e.g., a fingerprinting heuristics), a security and consistency checking function, a differential function, a time of flight function, a time of arrival function, a time difference of arrival function, an angle of departure function, a geometric function, a machine learning function, etc., or any combination thereof. As described herein, output from multiple algorithms may be combined or correlated in a variety of ways to determine a position LE. Additionally, or alternatively, a position LE determined from one or more algorithms may be enhanced by one or more other algorithms (e.g., by increasing accuracy, precision, or confidence, or a combination thereof).

III. Remote Device

The remote device 40 in accordance with one embodiment is shown in FIG. 1. The remote device 40 may be configured similar to the object device 50, including a control system similar to the control system of the object device 50 in several respects. For instance, the control system of the remote device 40 may include one or more processors that execute one or more applications (software and/or firmware), one or more communication interfaces, and a secure memory.

The remote device 40, as described herein, may include memory (e.g., RAM and/or ROM), which may be internal or external to the control system.

The remote device 40 may include a communication interface 53 and may be coupled to one or more antennas of an antenna array 30. The remote device 40, via the communication interface 53 and the antenna array 30, may establish a communication link 160 with the portable device 20. The communication link 160 may be established according to the UWB standard, or according to any type of communications described herein, including BTLE, UWB, and near field communication (NFC).

Alternatively, the communication link 160, as described herein, may be passive relative to the remote device 40 such that the remote device 40 passively receives communications between the remote device 20 and the object device 50 that are communicated via the communication link 140. For instance, in this passive configuration, the remote device 20 may utilize the communication link 160 to monitor or receive transmissions that occur via the communication link 140 without interfering with or actively participating in the communication link 140.

The remote device 40 in the illustrated embodiment may include a remote device communicator capable of facilitating establishment of the communication link 130 with the object device 50 in conjunction with the communication interface 53 of the remote device 40.

The remote device 40, as described herein, may be similar to the object device 50. In one embodiment, the remote device 40 may be configured to perform any function described in connection with the object device 50. For instance, the remote device 40 may include a locator, which determines location information based on one or more sensed characteristics obtained by the remote device 40 or via communications from another device.

IV. First Path Power

Figure 6:
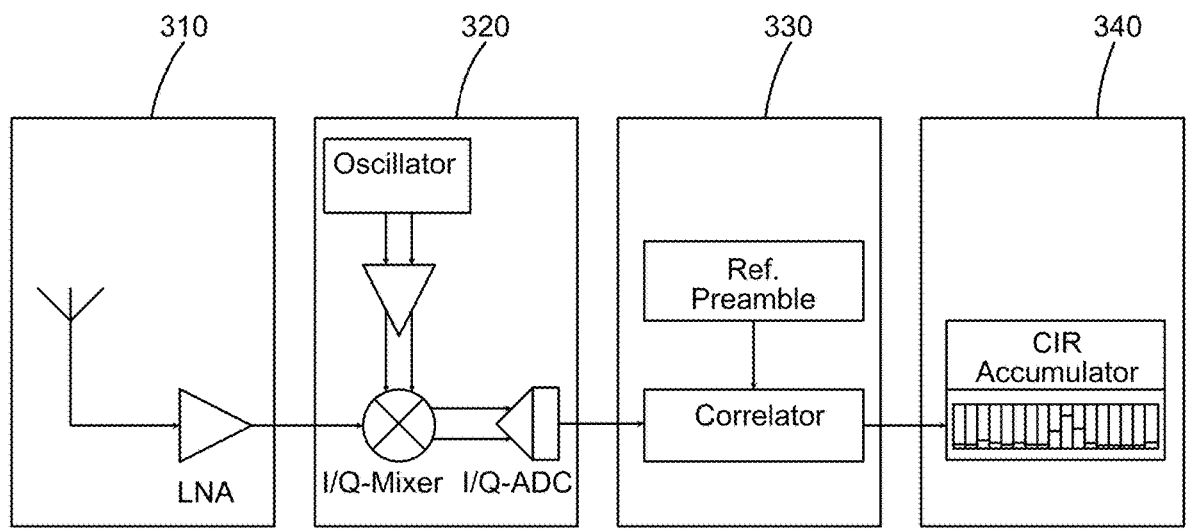
FIG. 6 shows a receiver stage for ultra wideband (UWB) communications in accordance with one embodiment.

As described herein, a system component, such as the object device 50 and/or the remote device 40, may be configured to determine a first path power with respect to UWB communications between the respective component and the portable device 20. A receiver for UWB communications in accordance with one embodiment is shown in FIG. 6, including an antenna stage 310, a mixer stage 320, and a correlator stage 330, which may determine the impulse response of the received signal by sliding across a time window. The output of the correlator stage 330 may be provided to an accumulator stage 340, which includes a channel impulse response (CIR) accumulator.

The transmitted signal, that is received by the antenna stage 310, may be a pseudo-random sequence (a preamble that for purposes of security is a randomized sequence that is keyed). The output of the correlator stage 330 may include spikes or pulses when the pseudo-random sequence of the transmitted signal is detected. The earliest spike may be either the direct response (line of sight) or no direct response was detected (no line of sight signal). Any spike after the first is a multipath response (that is, any spike after the first is a reflection or multiple reflections).

Because the UWB communications are wideband, the spikes are impulses. The spikes do not decay and therefore every non-zero entry is from a return.

Figure 7:
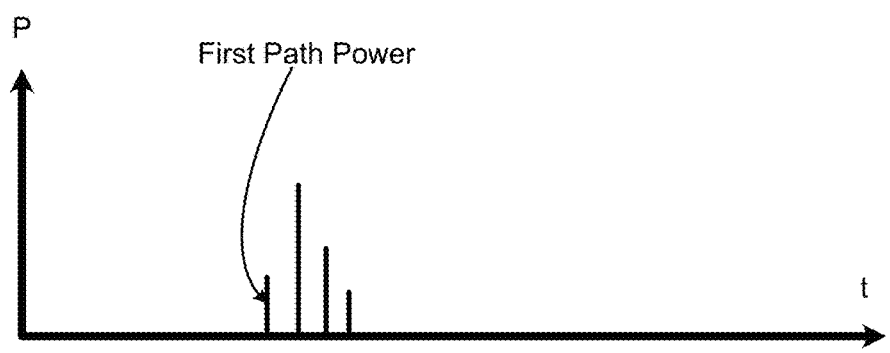
FIG. 7 shows a plot of impulses received according to UWB communications in accordance with one embodiment.

The correlator stage 330 and the accumulator stage 340 may be configured such that the outputs are a power measurement (e.g., in dBm). As a result, the first path power may be a calibrated power measurement of the temporally first output of the correlator stage 330 that exceeds some predetermined threshold value. In other words, all peaks below the threshold may be zeroed out because they are at or below some noise floor. This type of threshold filtering can be seen in FIG. 7, which corresponds to the CIR accumulator values shown in FIG. 6 except values below or at the threshold are zeroed out, leaving the first pulse as the identified first path power.

It is noted that, for Bluetooth communications, signal strength (also described as RSSI) of the Bluetooth communications is often determined as a power measurement in dBm units. Although first path power may be identified in terms of a power measurement, it is noted that first path power for UWB communications is different from signal strength of Bluetooth communications.

For signal strength of Bluetooth communications (e.g., RSSI of the Bluetooth communications), the signal strength depends on distance and broadcasting power value and can be used to approximate distance between the device and the anchor as follows:

$$\text{distance} = 10^{\frac{\text{Measured power at 1m} - RSSI}{10*N}},$$

where measured power at 1 m is a calibration measurement and N is a correction coefficient (e.g., a fudge factor) based on environment.

In contrast to RSSI for Bluetooth communications, first path power may not be translated directly to a distance (or range). In other words, in contrast to RSSI for Bluetooth communications, the range for UWB communications is determined by time or how long the RF pulse took to go from one device to another device. For example, a first path power of −50 dBm and a first path power of −100 dBm occurring at the same time bin result in the same range. In this example, the −50 dBm data point probably is line of sight whereas the −100 dBm data point was probably not line of sight.

Figure 8:
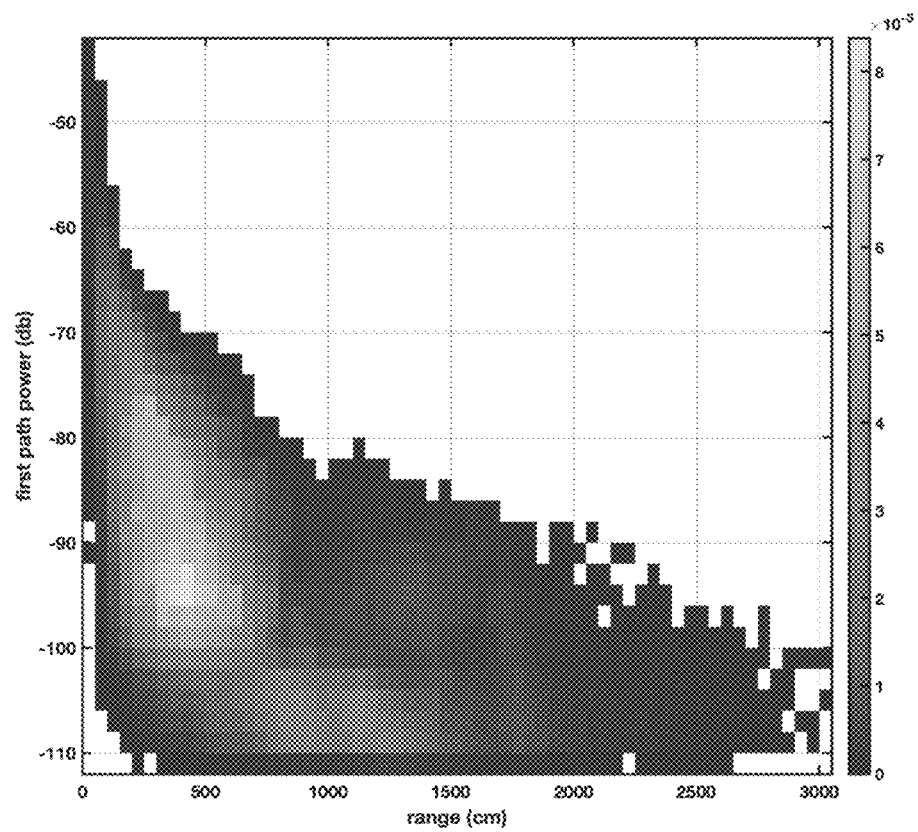
FIG. 8 shows a 2-D histogram of first path power and range for UWB communications in accordance with one embodiment, with the histogram normalized subsystem total of all histogram bins is one.

A histogram in the form of a heat map for first path power and range is shown in the illustrated embodiment of FIG. 8, illustrating that for a particular range there is a distribution of first path power values. As depicted, any one first path value may not be translated directly to a range or distance in contrast to RSSI being able to be translated to distance for Bluetooth communications. However, in accordance with one embodiment, the first path power values, including the distribution thereof, may be provided to an algorithm to facilitate determining a distance or range in accordance with one embodiment. For instance, the distribution of first path power values appears to vary as a function of distance. As another example, a single first path power value may not be directly translated to a distance; however, the single first path value may at least provide a degree of confidence with respect to a distance or range and corroborate or support a range or distance determined based on one or more parameters other than the first path power value (e.g., time of flight for the UWB communications).

V. Locator

The system 100 in the illustrated embodiment of FIGS. 1-3 may be configured to determine location information about the portable device 20 relative to the object 10. The location information may be indicative of an exterior location of the portable device 20 relative to the object 10, or the location information may be indicative of an interior location of the portable device 20 within the object 10, or a combination thereof. In one embodiment, a locator may be configured to determine this location information. The locator, as described herein, may be configured to determine a differential first path power based on first and second characteristics obtained respectively from first and second devices, where the first and second characteristics each correspond to a first path power determined respectively by the first and second devices. The differential first path power may form a distribution similar to the distribution of first path power depicted in FIG. 8, except the differential approach may yield a distribution that is unaffected or less affected by variations in antenna configuration among devices of different types (e.g., an Apple iPhone vs. a Samsung Galaxy).

The output from one locator may be enhanced by the output of another locator. For instance, accuracy, precision, or confidence, or any combination thereof, of output from one locator may be enhanced with the output of another locator.

The location information output from a locator in accordance with one embodiment may include positional information or a zone classification, or both. Positional information may correspond to coordinates (absolute or relative) or a distance relative to a reference point. The reference point may be defined as the location of the device in which the locator is provided, or another location of the object. One or more locators may use the same or different reference points. The zone classification may correspond to a region of space defined with respect to the vehicle, such as the zones described herein. First and second zones of the available zone classifications may be defined relative to each other in a variety of ways. For instance, the first and second zones may or may not intersect. As another example, the second zone may be a proper subset of the first zone (e.g., the second zone may be smaller and contained within the first zone). Any locator described herein may be configured to provide location information in the form of positional information or a zone classification, or both.

Figure 4:
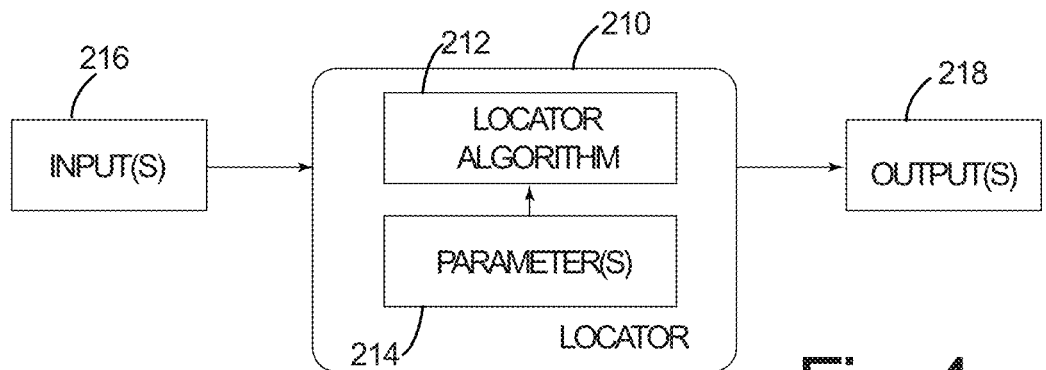
FIG. 4 shows a locator in accordance with one embodiment.

A locator in accordance with one embodiment is depicted in FIG. 4 and generally designated 210. The locator 210 may be configured to receive one or more inputs 216, such as one or more signal characteristics of wireless communications transmitted by the portable device 20 and received by one or more remote devices 40 and/or the object device 50. The inputs may be translated to one or more outputs 218 corresponding to the location information.

It should be understood that the inputs 216 are not limited to signal characteristics of wireless communications. The inputs 216 may include one or more measurements of characteristics or parameters other than wireless communications. Additionally, or alternatively, the inputs 216 may be indicative of a state of the object 10 or another device in the system 100. For instance, in the context of a vehicle, one or more of the inputs 216 may indicate that one or more of the vehicle doors are open or closed, or whether a window is open or closed.

The locator 210 in the illustrated embodiment may be incorporated into at least one of the object device 50 and a remote device 40. For instance, the controller 58 of the object device 50 may incorporate the locator 210, and be communicatively coupled to one or more of the remote devices 40 via the communication interface 53. As another example, the controller 58 of the remote device 40 may incorporate the locator 210, and may be communicatively coupled to at least one of the object device 50 and one or more other remote devices 40.

The locator 210 may include a core function or locator algorithm 212 that is configured to receive the one or more inputs 216 and to generate the one or more outputs 218 indicative of a location of the portable device 20 relative to the object 10. As discussed herein, the one or more inputs 216 may vary from application to application. Examples of inputs 216 include one or more signal characteristics of the communications, such as first path power for UWB communications, signal strength (RSSI), angle of arrival (AOA), and time of flight (TOF).

The locator 210 in one embodiment may translate the signal characteristic obtained from a remote device 40 or the object device 50 to a distance metric or other parameter in a variety of ways, including, for instance, a translation table for each fixed position device or type of fixed position devices, fingerprinting or other heuristic (e.g., a machine learned translator). Additional examples of such a translation are described in U.S. Pub. 2020/0137817, entitled SYSTEM AND METHOD OF DETERMINING REAL-TIME LOCATION, filed Oct. 23, 2019, to Smith—the disclosure of which is hereby incorporated by reference in its entirety.

The locator algorithm 212 of the locator 210 may be tunable according to a plurality of parameters 214 of the locator 210. Based on the one or more inputs and the values of the plurality of parameters 214, the locator algorithm 212 may provide an output indicative of a location of the portable device 20 relative to the object 10. The locator algorithm 212 may vary from application to application.

In one example, the locator algorithm 212 may be a neural network (e.g., a convolutional neural network with one or more layers), and the one or more parameters may include weights of nodes within the neural network. The weights may be adjusted during training of the locator 210 with samples obtained from a portable device 20 and the object 10 and truth information obtained with respect to the samples.

In a vehicle, there may be many antennas in accordance with one embodiment of the system 100, where each of the antennas may be in a different location with a different orientation. All or a subset of the antennas and associated devices, such as the object device 50 or the remote device 40, may facilitate obtaining first path power, RSSI, angle of arrival, time of flight, or other, or any combination thereof, measurements simultaneously.

Because a variety of factors can affect one or more signal characteristics of communications between a receiver and a transmitter, to facilitate tuning the locator 210 and the locator algorithm 212, samples may be obtained for the one or more signal characteristics under a variety of conditions.

Example variations in conditions can include purposefully rotating the portable device 20 in all directions, as well as obtaining test samples at different heights to ground, to force testing or obtaining samples to cover a large percentage of all possible angles/orientations.

Figure 5:
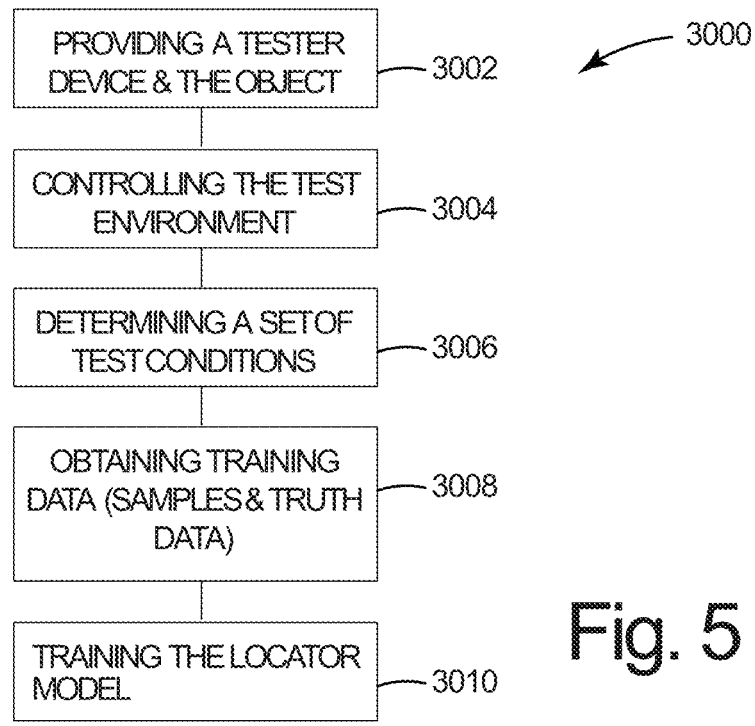
FIG. 5 shows a method of training a locator in accordance with one embodiment.

In the illustrated embodiment of FIG. 5, a method of training the locator 210 is shown and generally designated 3000. The method 3000 may include obtaining training data with respect to a portable device 20 under test and the object 10. The process of obtaining training data for the portable device 20 under test may be conducted by moving the portable device 20 to various locations relative to the object and obtaining training data at each of the locations. The orientation of the portable device 20 may be varied at each location, with the orientation and location being recorded as part of the training data. Additionally, or alternatively, an obstruction may be selectively provided in the path between the portable device 20 under test and the object 10, with the position of the obstruction being recorded as part of the training data. An example of procedures for obtaining training data is described in U.S. Patent Application Publication 2020/0196095, entitled SYSTEM AND METHOD OF CALIBRATION FOR ESTABLISHING REAL-TIME LOCATION, to Smith et al, filed Dec. 13, 2019—the disclosure of which is hereby incorporated by reference in its entirety.

In one embodiment, the method 3000 may involve controlling the test environment for the portable device 20 under test and the object 10. Steps 3002, 3004. The method 3000 may also involve establishing a set of conditions for obtaining samples for the portable device 20 under test and the object 10 that is repeatable. With the set of conditions established and the portable device 20 under test and the object 10 being provided, training data for the locator 210 may be obtained. The training data in one embodiment may include a plurality of samples corresponding to one or more sensed characteristics of communication between the portable device 20 under test and the object device 50 or sensor device, or both, as well as truth information with respect to one or more characteristics of the portable device 20 under test (e.g., location, height, orientation, and placement). Step 3008.

An example of procedures for obtaining training data is described in U.S. Patent Application Publication 2020/0196094, entitled SYSTEM AND METHOD OF DETERMINING REAL-TIME LOCATION, to Smith et al, filed Dec. 13, 2019—the disclosure of which is hereby incorporated by reference in its entirety and U.S. Patent Application Publication 2020/0196095, entitled SYSTEM AND METHOD OF CALIBRATION FOR ESTABLISHING REAL-TIME LOCATION, to Smith et al, filed Dec. 13, 2019—the disclosure of which is hereby incorporated by reference in its entirety.

As an example, the training data in accordance with one embodiment may include a first path power determined separately by first and second devices based on UWB communications with the portable device 20 under test. A differential first path power may be determined from these first path power values determined separately by the first and second devices. The differential first path power value may be unaffected or less affected by different antenna configurations for different types of portable devices 20. For instance, the first path power determined separately by the first and second devices with respect to UWB communications may be a function of the antenna gains of the first and second devices as well as the antenna gain of the portable device 20. The first and second devices remain the same or are fixed in a system 100 provided for the object 10; however, the portable device 20 may vary from user to user. Differential first path power may eliminate or reduce effects due to variation in the antenna gain of the portable device, or due to any other aspects of the portable device, that varies between different types of portable devices (or potentially among the same type of portable device). Rather than training a locator 210 for each type of portable device 20, the differential first path power may be used as a basis for training the locator 210 in an effort to obtain a locator 210 that is operable with multiple types of portable devices 20 or unaffected (or less affected) by variations among device types and devices of the same type.

The method 3000 may include the process of training the locator 210 based on the training data obtained with respect to the portable device 20 under test and the object 10. For instance, the one or more parameters 214 may be varied during training to affect the output 218 of the locator 210. The output 218 may be compared against the truth information, and the one or more parameters 214 may be varied in an effort to reduce or minimize an error metric (e.g., mean squared error) determined with respect to the output 218 and the truth information. Step 3010. The process of adjusting one or more parameters 214 may be conducted in an iterative manner until the error metric satisfies an acceptable target value.

As described herein, the differential first path power may not be directly translatable to a distance or range for the portable device 20 relative to the object 10. The differential first path power may be one of a plurality of inputs 216 provided to the locator 210 to yield an output 218 indicative of a range or distance. In this way, the differential first path power may support or provide a degree of confidence with respect to the range or distance, despite a single differential first path power value not being directly translatable to a distance or range.

In one embodiment, the locator 210 may be based on a gradient boosting framework that involves a decision-tree-based algorithm. Aspects of the differential first path power value or values (e.g., the distribution of differential first path power values) may affect the decision tree analysis to support or enhance confidence with respect to a distance or range determination based primarily on one or more other inputs, such as the time of flight determined from UWB communications.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A system for determining location information with respect to a portable device and an object, the system comprising:

a first device disposed in a first fixed position relative to the object, the first device capable of communicating with the portable device in accordance with an ultra-wideband communication protocol, the first device operable to determine a first power characteristic indicative of a first path power of communications between the first device and the portable device;

a second device disposed in a second fixed position relative to the object, the second device capable of communicating with the portable device in accordance with the ultra-wideband communication protocol, the second device operable to determine a second power characteristic indicative of a first path power of communications between the second device and the portable device;

a controller operable to determine a differential first path power based on a difference between the first and second power characteristics respectively indicative of the first path power of communications between the first device and the portable device and the first path power of communications between the second device and the portable device; and the controller operable to determine the location information based on the differential first path power with respect to communications with the portable device in accordance with the ultra-wideband communication protocol, the controller including a locator operable to output the location information based on the differential first path power, wherein the locator includes at least one parameter, wherein an output of the locator is based on the at least one parameter and the differential first path power.

2. The system of claim 1 comprising a configuration processor operable to adjust the at least one parameter of the locator, the configuration processor including memory and operable to obtain truth information with respect to a location of the portable device relative to the object, the configuration processor operable to vary the at least one parameter of the locator based on a comparison of the output of the locator and the truth information.

3. The system of claim 2 wherein the locator includes an algorithmic model that is trainable via iterative adjustment of the at least one parameter based on a comparison of a model output for a given value of the at least one parameter and the truth information, wherein the algorithmic model is operable to receive as input the differential first path power, and wherein the differential first path power is correlated with the truth information with respect to the location of the portable device.

4. The system of claim 1 wherein:
the first device includes a first antenna operable to facilitate communications with a portable device antenna of the portable device; and
the second device includes a second antenna operable to facilitate communications with the portable device antenna of the portable device.

5. The system of claim 4 wherein:
the first power characteristic indicative of the first path power of the communications between the first device and the portable device is a function of a first gain of the first antenna and a portable device gain of the portable device antenna;
the second power characteristic indicative of the first path power of the communications between the second device and the portable device is a function of a second gain of the second antenna and the portable device gain of the portable device antenna; and
the portable device gain of the portable device is substantially absent from the differential first path power, whereby the differential first path power is substantially unaffected by variations in the portable device gain from one type of portable device to another type of portable device.

6. The system of claim 5 wherein an output of the locator is independent of variations in the portable device gain among various types of portable devices, such that the locator is operable to determine location information for multiple types of portable devices absent varying the at least one parameter for each type of the multiple types of portable devices.

7. A system for determining location information with respect to a portable device and an object, the system comprising:
a first device disposed in a first fixed position relative to the object, the first device capable of communicating with the portable device in accordance with an ultra-wideband communication protocol, the first device operable to determine a first power characteristic indicative of a first path power of communications between the first device and the portable device;
a second device disposed in a second fixed position relative to the object, the second device capable of communicating with the portable device in accordance with the ultra-wideband communication protocol, the second device operable to determine a second power characteristic indicative of a first path power of communications between the second device and the portable device;
a controller operable to determine a differential first path power based on a difference between the first and second power characteristics respectively indicative of the first path power of communications between the first device and the portable device and the first path power of communications between the second device and the portable device; and
the controller operable to determine the location information based on the differential first path power with respect to communications with the portable device in accordance with the ultra-wideband communication protocol, wherein the first path power is a power indicator associated with a first path in a multi-path environment.

8. A method of determining location information with respect to a portable device and an object, the method comprising:
communicating between the portable device and a first device in accordance with an ultra-wideband communication protocol;
generating a first power characteristic indicative of a first path power of communications between the first device and the portable device;
communicating between the portable device and a second device in accordance with the ultra-wideband communication protocol;
generating a second power characteristic indicative of a first path power of communications between the second device and the portable device;
calculating a differential first path power based on a difference between the first and second power characteristics respectively indicative of a first path power of communications between the first device and the portable device and a first path power of communications between the second device and the portable device; and
determining the location information based on the differential first path power with respect to communications with the portable device in accordance with the ultra-wideband communication protocol, said determining the location information including determining the location information based on the differential first path power and at least one parameter.

9. The method of claim 8 comprising adjusting the at least one parameter based on truth information with respect to a location of the portable device relative to the object.

10. The method of claim 9 comprising iteratively adjusting the at least one parameter to reduce an error metric determined with respect to determined location information and the truth information.

11. The method of claim 8 wherein the differential first path power is substantially unaffected by variations in an antenna gain from one type of portable device to another type of portable device.

12. A method of determining location information with respect to a portable device and an object, the method comprising:
communicating between the portable device and a first device in accordance with an ultra-wideband communication protocol;
generating a first power characteristic indicative of a first path power of communications between the first device and the portable device;
communicating between the portable device and a second device in accordance with the ultra-wideband communication protocol;
generating a second power characteristic indicative of a first path power of communications between the second device and the portable device;
calculating a differential first path power based on a difference between the first and second power characteristics respectively indicative of a first path power of communications between the first device and the portable device and a first path power of communications between the second device and the portable device; and
determining the location information based on the differential first path power with respect to communications with the portable device in accordance with the ultra-wideband communication protocol, wherein the first path power is a power indicator associated with a first path in a multi-path environment.

13. A device operable to determine location information with respect to a portable device and an object, the device comprising:
a memory;
a processor operably coupled to the memory, the processor configured to execute one or more instructions stored in the memory to:
obtain a first power characteristic indicative of a first path power of ultra-wideband communications between a first device and the portable device, wherein the first device is disposed in a fixed position relative to the object;
obtain a second power characteristic indicative of a first path power of ultra-wideband communications between a second device and the portable device, wherein the second device is disposed in a fixed position relative to the object;
calculate a differential first path power based on a difference between the first and second power characteristics respectively indicative of a first path power of communications between the first device and the portable device and a first path power of communications between the second device and the portable device;
determine the location information based on the differential first path power with respect to ultra-wideband communications with the portable device; and
determine the location information based on the differential first path power and at least one parameter.

14. The device of claim 13 wherein the second power characteristic is received from the second device, and wherein the device is the first device.

15. The device of claim 13 wherein the differential first path power is substantially unaffected by variations in an antenna gain from one type of portable device to another type of portable device.

16. The device of claim 13 wherein the at least one parameter is iteratively calculated by reducing an error metric calculated with respect to the location information and truth information pertaining to a location of the portable device relative to the object.

17. A device operable to determine location information with respect to a portable device and an object, the device comprising:
a memory;
a processor operably coupled to the memory, the processor configured to execute one or more instructions stored in the memory to:
obtain a first power characteristic indicative of a first path power of ultra-wideband communications between a first device and the portable device, wherein the first device is disposed in a fixed position relative to the object;
obtain a second power characteristic indicative of a first path power of ultra-wideband communications between a second device and the portable device, wherein the second device is disposed in a fixed position relative to the object;
calculate a differential first path power based on a difference between the first and second power characteristics respectively indicative of a first path power of communications between the first device and the portable device and a first path power of communications between the second device and the portable device; and
determine the location information based on the differential first path power with respect to ultra-wideband communications with the portable device, wherein the first path power is a power indicator associated with a first path in a multi-path environment.

* * * * *